April 30, 1940.         H. W. WISHART                2,198,930
                            WASHER
                        Filed Oct. 6, 1938
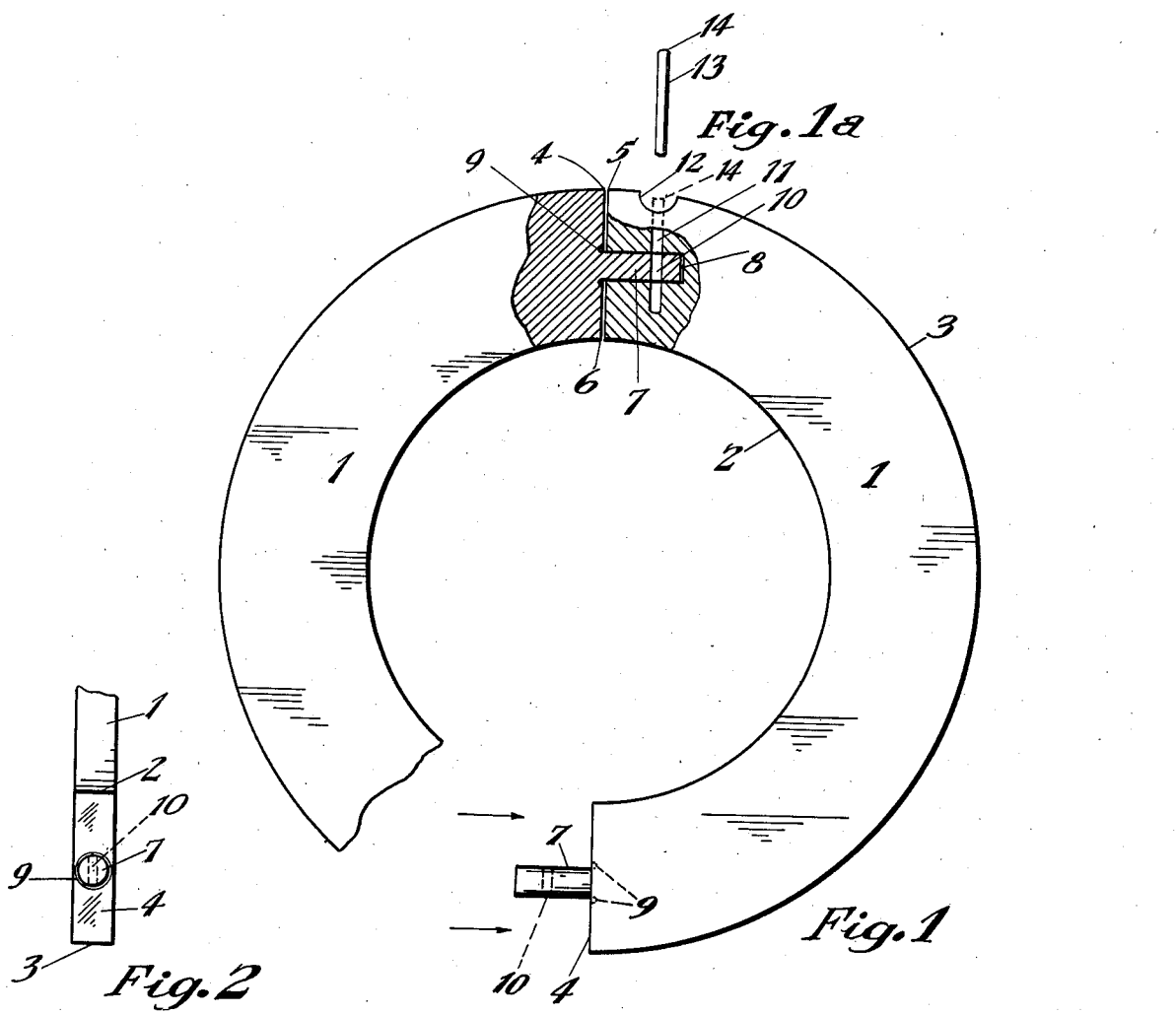
INVENTOR.
HAROLD W. WISHART
BY George B. Willcox
        ATTORNEY.

Patented Apr. 30, 1940

2,198,930

UNITED STATES PATENT OFFICE 2,198,930

WASHER

Harold W. Wishart, Saginaw, Mich., assignor to Fredericksen Company, Saginaw, Mich., a corporation of Michigan Application October 6, 1938, Serial No. 233,592

1 Claim. (Cl. 85—51)

My invention relates to improvements in washers of the type comprising a plurality of complementary sections adapted to be assembled as an annular ring around a rod or shaft and disassembled quickly and easily, either section being replaceable by a new section when desired.

It relates more particularly to a novel and simplified means for securing together the complementary sections so that they will remain in alignment with each other with their respective flat faces lying in the same plane.

An object is to provide as an integral part of each such washer section a fastening and aligning device which shall be constructed so as to be easily and accurately machined by simple and inexpensive operations and equipment, and providing a strong rigid washer at small cost.

In general, the objects of my improvement are simplicity and cheapness of construction and general efficiency and convenience of the article.

With the foregoing and certain other objects in view, which will appear later in the specifications, my invention comprises the devices described and claimed and the equivalents thereof.

Fig. 1 is a plan view of the washer assembled, the view being partly in section and partly broken away, with the shear pin removed.

Fig. 1a is a view of one of the concealed shear pins.

Fig. 2 is a fragmentary end view of one of the sections, seen in the direction of the arrows, Fig. 1.

A washer embodying my invention in a preferred form comprises a plurality of complementary similar sections 1, each of which has concentric inner and outer walls 2, 3, and parallel flat side walls.

When fastened together in the manner which will be described, the sections 1, 1 comprise an annular ring having a smooth bore on the inside, a smooth outer rim, and smooth flat sides.

As shown in the drawing, the annular ring is made up of two sections, 1, 1, but a greater number of complementary sections may be employed if desired. The interlocking mechanism by which the sections are fitted together and fastened consists of the following devices:

Each curved member 1 has faces 4, 5 to present confronting faces on the two parts when assembled. In the drawing a clearance is shown at 6 between the two confronting faces merely for purposes of illustration. It will be understood that in practice the faces are in close abutting relation with each other. One end face 4 has projecting from it a dowel 7, preferably circular. Usually section 1 is a casting made of a suitable bearing metal alloy and the dowel 7 is integral with it. The other end 5 of the section 1 is formed with a bore hole 8 to receive the complementary dowel 7 of the other section, the dowel being machined to closely fit the bore, as is shown at the top of Fig. 1. A groove 9 extends around the base of the dowel 6, to provide a fillet that prevents fracture of the dowel at its base and also to provide a clearance that enables the two end faces 4, 5 to come into intimate contact with each other.

Each pin 7 is formed with a transverse hole 10, and in alignment with this hole the complementary section of ring 1 is bored with a similar hole 11 that extends from the outer periphery of the ring through the bore hole 8 and preferably terminates before reaching the inner bore of the ring section. The hole 11 in section 1 may terminate in a transverse groove 12 formed in the outer wall 3.

In assembling the sections a shear pin 13, shown in Fig. 1a, is inserted with a moderate push fit into the alined hole 11 and through the hole 10 of dowel 7. The upper end of the shear pin 13 projects into the groove 12, as indicated by dotted lines, Fig. 1, but not beyond the outer face 3 of the washer. The outer end 14 of the shear pin 13 may be swaged slightly, as by a center punch, to keep the pin in place and yet permit its removal.

The shear pin hole 11 is so accurately in register with the hole 10 that the shear pin 13 can be passed through without deforming the pieces by burrs. Also, the closeness of the fit between the dowel 7 and the hole 8 in section 1 enables the pin 13 to be made of very small diameter, say, one-sixteenth inch or less, and still be effective to hold the ring sections together under all conditions of use of the washer, since the only stresses on the pin and also on the dowel are simple direct shears and not bending strains, as might be the case if the dowel 7 and the member 1 did not fit each other accurately. The shape and arrangement of the dowel enable this to be done at very small cost.

Heretofore, in structures of this kind the interlocking members were usually wedge shaped or else stepped in cross-section. Their several flat faces had to be machined exactly and the walls of the matching recess had to be equally exact or else the assembled washer was not rigid, their faces tending to get out of parallelism and present non-uniform bearing surfaces to take the thrust when the washer was used as a thrust bearing. That difficulty is obviated in my device because the dowel 7 can be formed accurately by a simple turning tool without the aid of expensive machinery, and the hole 8 can be easily bored so exactly that an extremely close fit can be obtained, giving adequate rigidity to the assembled washer in all directions. This locking device considered as an article of manufacture is very simple and cheap. It is easily assembled by a straight inward movement, afterward pushing in the shear pin 13. The upper end of pin 13 that projects into the recess 12 can be seized by pliers and pulled out whenever it is desired to disassemble the washer, yet the projecting end can not cause any damage if the washer happens to rotate in use.

Either section if worn can be replaced by a new section, since all sections are alike and interchangeable.

The dowell pin is reinforced against being broken off by the fillet groove 9 around its base, and the end faces 4, 5 of the two abutting sections of the washer are brought into close face-to-face contact and held by the resistance to shear of the pin 13. The dowel 7 is not subjected to bending action, which would otherwise be present if the shape and size of the pin and its fit in the bore of the opposite piece were to permit any appreciable amount of play between the parts.

The fillet groove 9 may in some cases be dispensed with if desired, and a fillet of usual shape without a groove may be employed.

Having thus described my invention, what I claim and desire to secure by Letter Patent is:

A metal washer comprising two similar flat semi-circular sections each having two flat end faces, one face of each section being provided with a bore, the other face of each section being provided with a projecting dowel tangential to the circle of the washer and received within and fitting closely the bore of the other section when said sections are in assembled relation; there being a transverse hole through each of said sections intersecting the bore therein and a transverse hole through each dowel, said holes being in alinement when the said faces are in abutting relation, and a pin received in and extending through said alined holes.

HAROLD W. WISHART.